Sept. 23, 1930.  J. DOYLE  1,776,680
FISH SPEAR
Filed Dec. 23, 1927
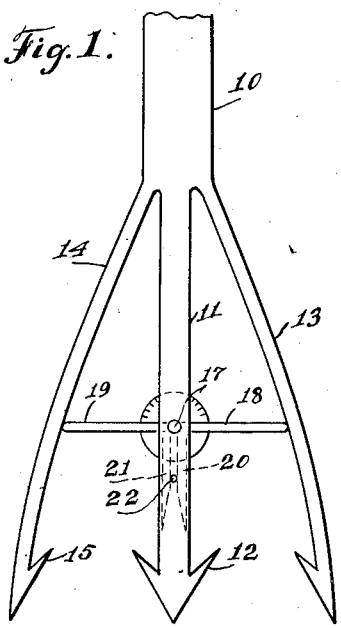
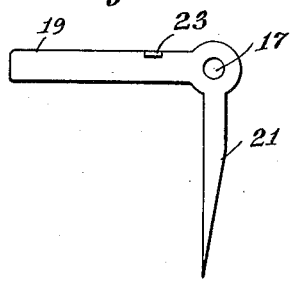
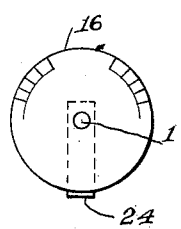
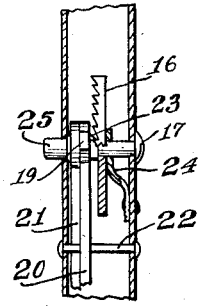
Inventor
John Doyle
By his Attorney
George C. Heinricks Patented Sept. 23, 1930

1,776,680

UNITED STATES PATENT OFFICE

JOHN DOYLE, OF CONEY ISLAND, NEW YORK

FISH SPEAR

Application filed December 23, 1927. Serial No. 242,237.

This invention relates to improvements in fish spears and has for its object to provide a spear of this character which will positively prevent the escape of a caught fish.

It is the principal object of my invention to provide a fish spear of comparatively simple and inexpensive construction, yet durable and efficient in operation.

Another object of my invention is the provision of a fish spear equipped with movable jaws closing against the spear as soon as the same strikes a fish and embedding their hooks into the body of the fish preventing its escape.

A further object of my invention is the provision of a fish spear allowing a convenient resetting of the parts for a new operation after each spearing of a fish.

These and other objects and advantages of my invention will become more fully apparent as the description thereof proceeds, and will then be specifically defined in the appended claims.

In the accompanying drawing forming a material part of this disclosure:

Fig. 1 is a front elevation of my device ready for operation.

Fig. 2 is a fragmentary sectional side elevation thereof.

Fig. 3 is a detail view of a ratchet.

Fig. 4 is a detail view of one of the lever arms and depending members.

As illustrated, the fish spear according to my invention comprises a shaft 10, with which is integrally made a centrally located partly hollow prong or spear 11 depending therefrom and equipped with the barbs 12.

Also integrally made with the shaft are the resilient prongs 13 and 14 respectively on opposite sides of the central prong or spear 11 and equipped at their lower ends with inwardly directed barbs 15.

The hollow prong or spear 11 carries ratchet 16 rotating on a transverse pin 17 or the like, with which are combined lever arms 18 and 19 respectively extending in opposite directions and normally engaging with their outer ends the inner faces of prongs 13, 14 to hold the same normally spread and distanced from the central spear.

Arms 20, 21, normally depending from lever arms 18, 19 and arranged within the hollow prong 11 are separated by a pin 22, and lever arms 18, 19 have teeth 23 engaging the ratchet and are held in engagement therewith by means of a spring 24.

The device operates as follows:

As soon as spear 11 with its barbs 12 enters the body of a fish the body of the same will swing lever arms 18, 19 into a position allowing the barbs 15 of resilient prongs 13, 14 to enter the body of the fish, while simultaneously arms 20, 21 with their pointed ends will enter the body of the fish so that the same is securely held and cannot escape.

A proper manipulation of pin 17 by a suitable tool engaging its boss 25 will allow a resetting of the parts for a new operation.

It will be understood that I have described and shown the preferred form of my device as one example of the many possible ways to practically construct the same and that I may make such changes in its general arrangement and in the construction of the minor details thereof as come within the scope of the appended claims without departure from the spirit of my invention and the principles involved.

Having thus described my invention, what I claim as new and desire to secure by Letters Patent is:—

1. A fish-spear comprising a central prong, lateral prongs combined therewith, means for normally keeping the lateral prongs apart from said central prong allowing movement of said lateral prongs against the central prong upon the spearing of a fish to positively hold the fish, and means for resetting the prongs after each catch.

2. A fish-spear comprising a partly hollow central prong, lateral prongs combined therewith, a ratchet on said central prong, a transverse pin in said central prong, levers combined with depending arms on said pin engaging said ratchet for normally keeping the lateral prongs apart from said central prong but allowing a turning about said ratchet upon the spearing of a fish by said central prong, and a means for resetting the prongs after each catch.

3. A fish-spear comprising a central prong having a lower barbed end, lateral prongs, barbs at the ends of said lateral prongs directed to said central prong and its barbs, a ratchet on said central prong, a transverse pin in said central prong, lever arms having depending arms on said pin engaging said ratchet for normally keeping the lateral prongs apart from said central prong, said depending arms adapted to turn with said ratchet upon the spearing of a fish by said central prong to turn said lever arms to allow a movement of the lateral prongs towards the central prong to embed their barbs into the fish speared by said central prong preventing the escape of the caught fish and a means for resetting the parts after each catch.

4. In a fish-spear, a hollow central barbed prong, a ratchet on said central prong, lateral resilient barbed prongs integrally made with said central prong, a transverse pin in said central prong, lever arms combined therewith, means for normally setting said arms to keep said lateral prongs spaced from said central prong, depending arms on said lever arms having pointed ends, a pin for keeping said depending arms apart, teeth on said lever arms engaging said ratchet, a spring for normally keeping said teeth in engagement with said ratchet, said lever arms adapted to swing about their pin upon the engagement by the body of a fish caught by the central prong, said depending arms adapted to engage the body of the fish, and a means for allowing a resetting of the parts after each operation.

JOHN DOYLE.